Oct. 2, 1928.
L. N. D. WILLIAMS
1,685,795
MECHANISM FOR UNITING KNITTED WEBS
Filed Dec. 12, 1923   7 Sheets-Sheet 3
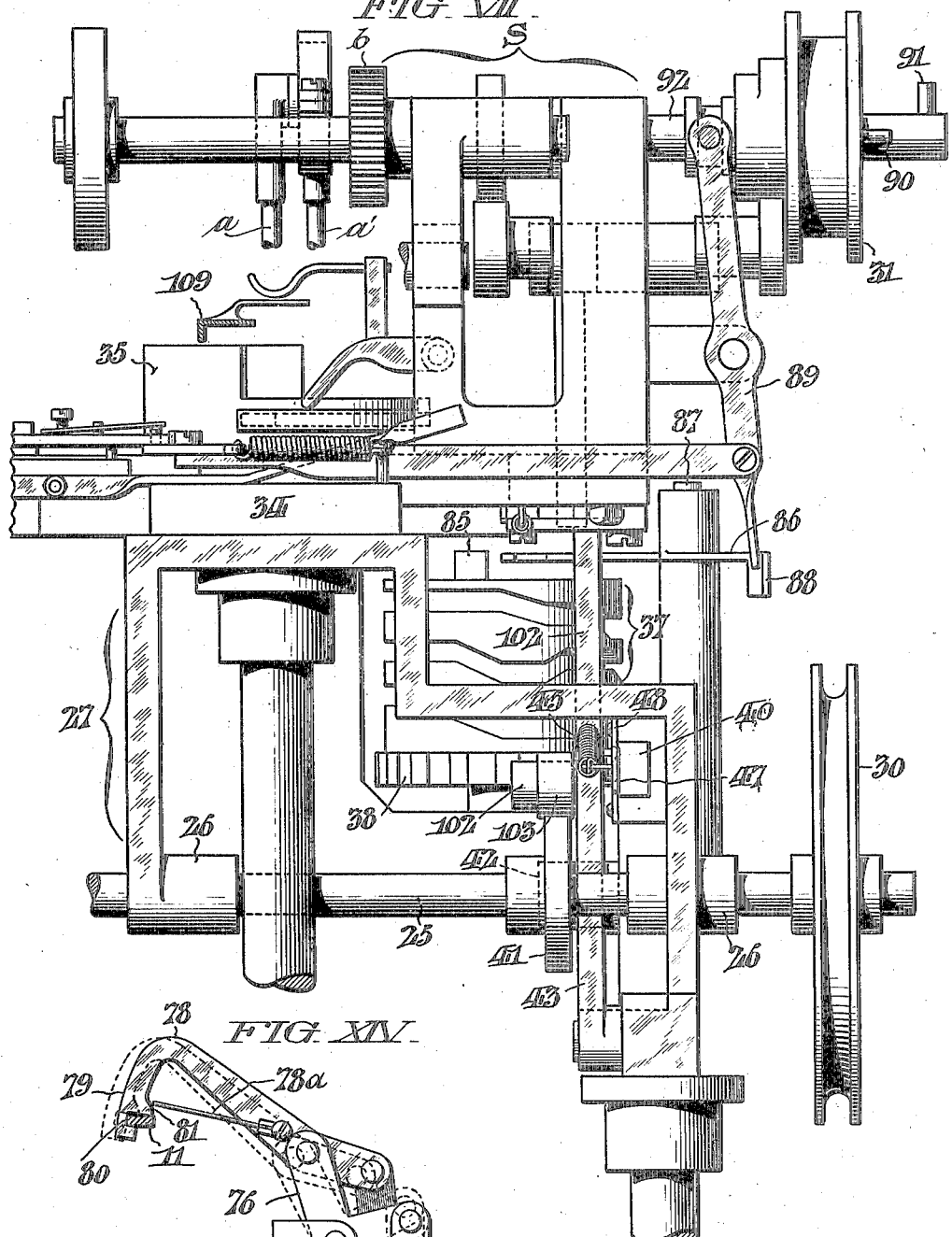

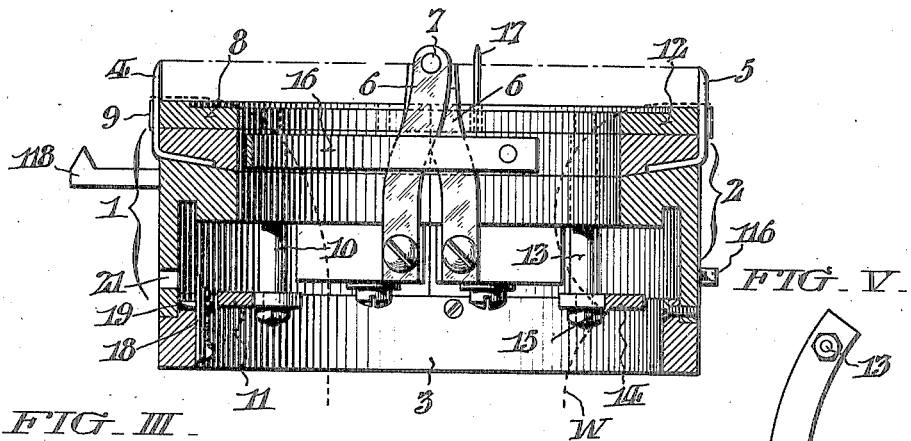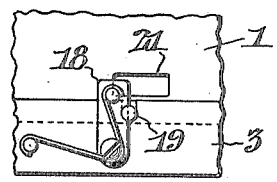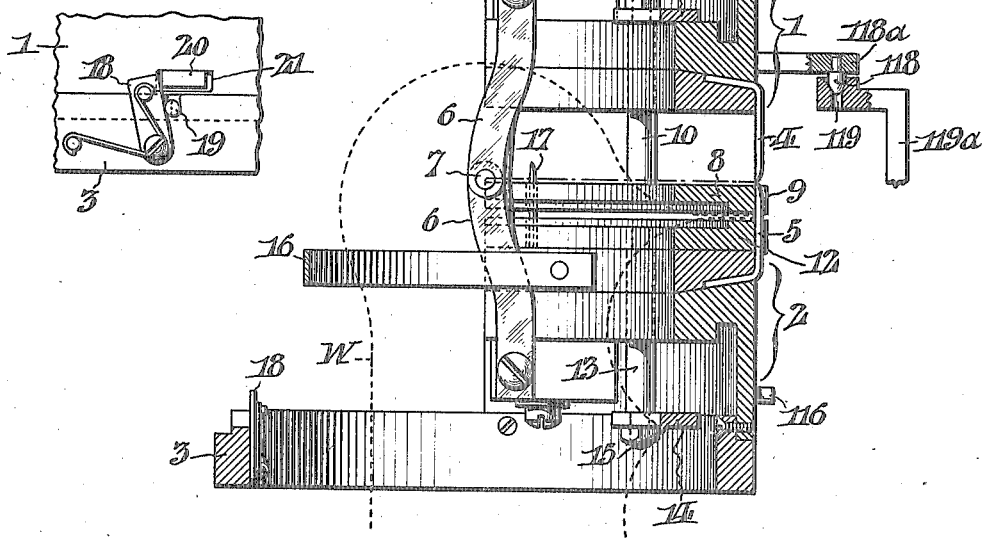

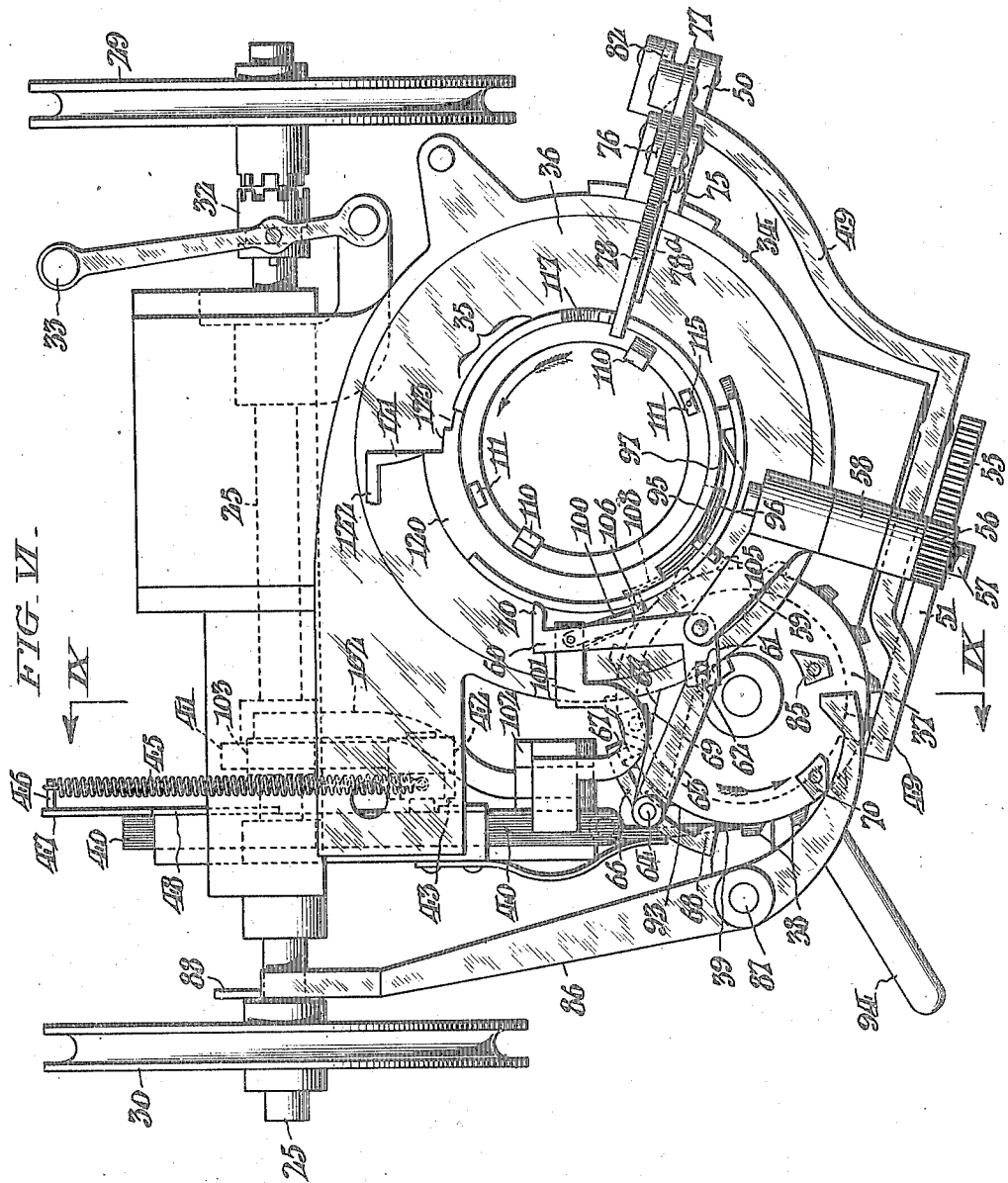

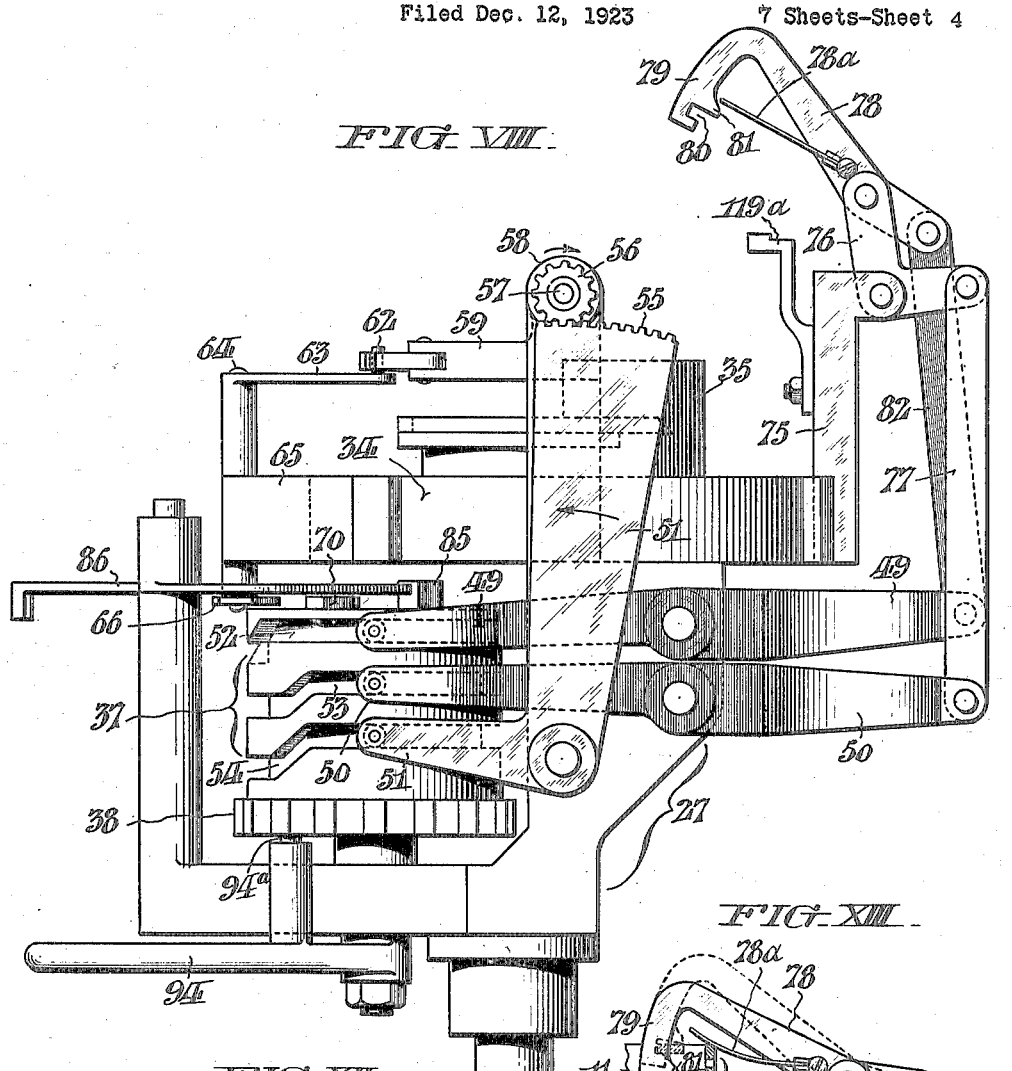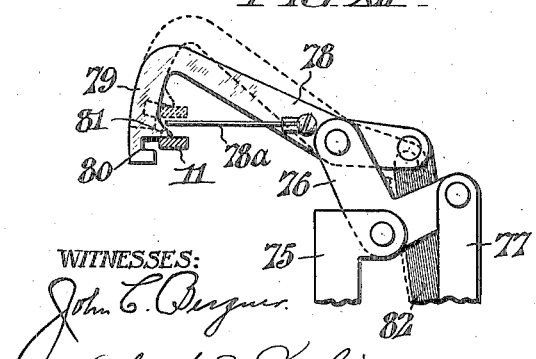

Oct. 2, 1928.  
L. N. D. WILLIAMS  
1,685,795  
MECHANISM FOR UNITING KNITTED WEBS  
Filed Dec. 12, 1923   7 Sheets-Sheet 5
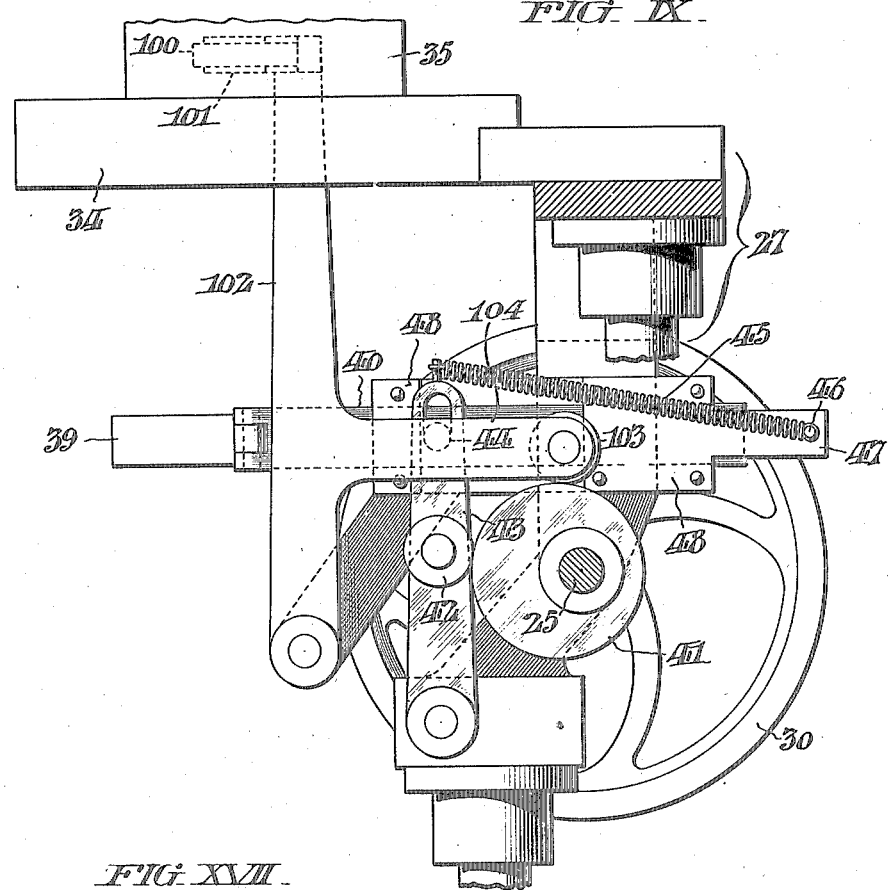
FIG. IX.
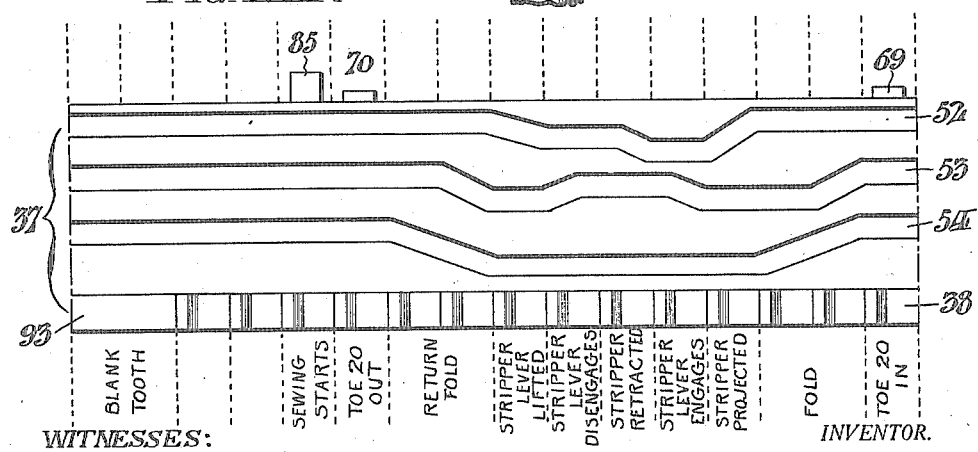
FIG. XVII.

Oct. 2, 1928.  
L. N. D. WILLIAMS  
1,685,795  
MECHANISM FOR UNITING KNITTED WEBS  
Filed Dec. 12, 1923 7 Sheets-Sheet 6
FIG. X
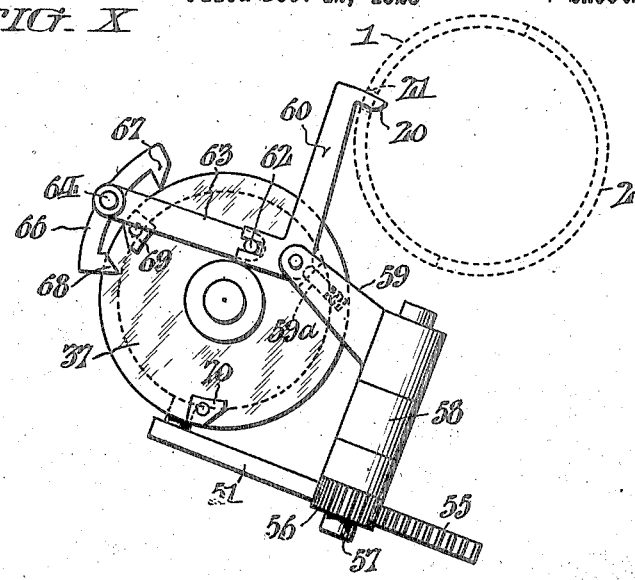
FIG. XI
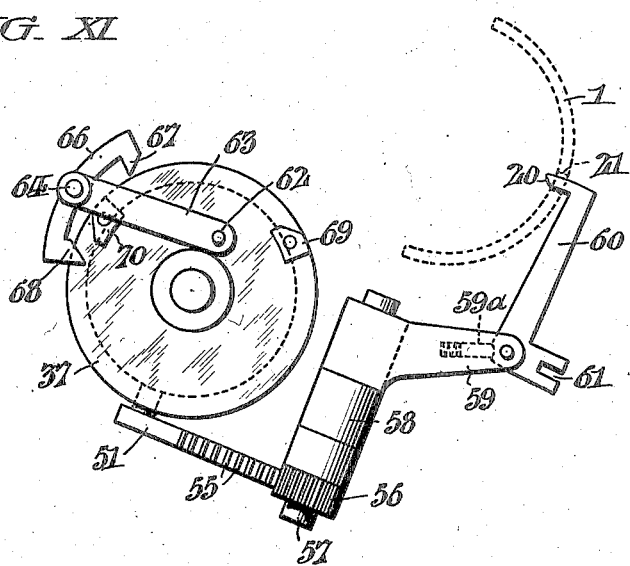

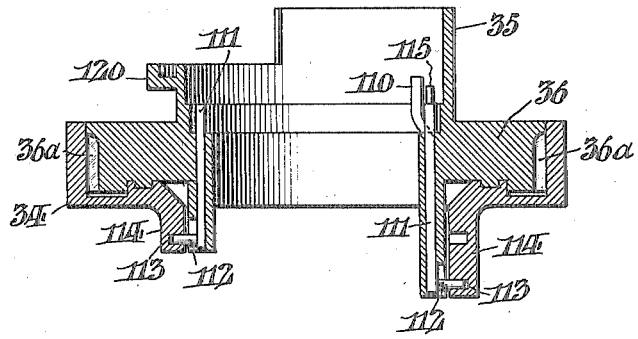
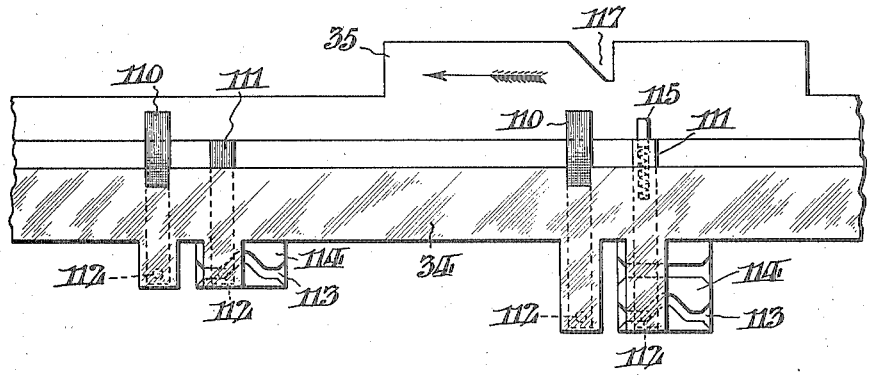
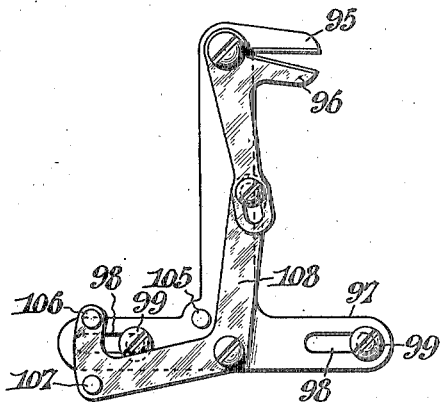
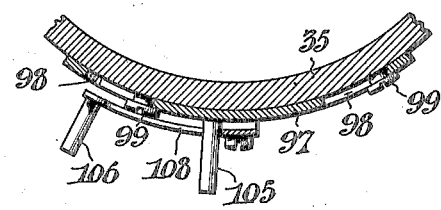

Patented Oct. 2, 1928.

1,685,795

UNITED STATES PATENT OFFICE.

LOUIS N. D. WILLIAMS, OF OGONTZ, PENNSYLVANIA, ASSIGNOR TO SCOTT & WILLIAMS, INCORPORATED, OF NEW YORK, N. Y., A CORPORATION OF MASSACHUSETTS.

MECHANISM FOR UNITING KNITTED WEBS.

Application filed December 12, 1923. Serial No. 680,064.

This invention relates to machines for uniting knitted webs and is in the nature of an improvement upon a machine of this kind for which Patent No. 1,315,064 was granted me under date of September 2, 1919. As stated in the patent referred to, the machine is especially useful in connection with the manufacture of seamless hosiery where it is necessary, in order to complete a stocking, to unite the opposite edges of the opening left after the toe pocket is knit. This operation is made possible in accordance with the cited patent by use of a transfer device or web carrier capable of receiving the stocking from the knitting machine, said device being composed of two members or segments hinged together so as to be swingable, one over the other, to permit transfer of the fabric loops on the points of the one to the points of the other, thereby to double said loops with those already on the latter points in readiness to be stitched together by the sewing mechanism of the uniting machine.

The present invention is directed toward providing, in connection with the usual sewing mechanism, means for automatically manipulating the web carrier to bring about loop transfer and doubling as aforesaid, and final displacement of the carrier at the completion of the sewing operation from the holder provided therefor in the machine, so that said web carrier or transfer device may be conveniently removed for re-use by the operative.

In the drawings Fig. I is an axial sectional view of the web carrier employed in the machine of my invention with the stocking thereon as received from the needles of a circular knitting machine.

Fig. II is a similar view of the device with one of its segments swung over the top of the other to effect registry of the respective loop carrying points for stitch doubling.

Fig. III is a face view of a portion of the interior of the transfer device showing the means for maintaining its component segments locked in the normal position shown in Fig. I.

Fig. IV is a view similar to Fig. III showing said means in unlocked position.

Fig. V is a bottom plan of a stripper actuating bar associated with one of the segments of the transfer device or web carrier.

Fig. VI is a top plan view of the web uniting machine showing only those parts necessary to a proper understanding of my invention.

Fig. VII is a side elevation of the machine, as viewed from the top of Fig. VI, showing a portion of the sewing mechanism whereby the doubled loops of the knitted web are united.

Fig. VIII is a side elevation of the machine viewed from the bottom of Fig. VI.

Fig. IX is a view mainly in elevation with some parts in section, taken as indicated by the arrows IX—IX in Fig. VI, and illustrating more particularly the means for progressing the cam drum whereby the various operations of the machine are controlled.

Figs. X and XI are detached views showing, in different positions, the means for turning one of the web carrying segments of the transfer device or web carrier from the position of Fig. I to that of Fig. II.

Figs. XII, XIII and XIV are detached views showing, in different positions, the means for operating the stripper actuating bar whereby stitches are transferred from the points of one segment of the transfer device or web carrier and doubled with those of the other.

Fig. XV is a vertical sectional view, and Fig. XVI a side elevation, extended in a flat plane, of mechanism employed for lifting the web carrier or ring so that the latter can be readily removed from its support in the machine after the doubled fabric loops have been united by sewing.

Fig. XVII is a diagrammatic illustration showing a development of the cam drum already referred to.

Fig. XVIII is a side elevation, on an enlarged scale, of the shear mechanism whereby the prolongation of the uniting stitches is severed after the sewing operation is completed; and Fig. XIX is a view partly in horizontal section and partly in plan, of the shear mechanism shown in Fig. XVIII.

Referring first to Figs. I and II which illustrate the transfer device or web carrier, it will be observed that the same is annular in form, comprising two component complementary segments 1 and 2, of which the latter is fixedly secured to a base ring 3. These segments 1, 2 are respectively provided with points 4, 5, adapted to receive the loops of the stocking fabric or web "W" from the needles of a circular knitting machine, and are connected by means of hinge bars 6—6 pivoted together at 7. By virtue of this arrangement, the segment 1 may be swung or turned over upon the companion segment 2, as shown in Fig. II, to bring the points 4 into opposed relation and alignment with the points 5, so that the fabric loops may be displaced from the points 4 and transferred to the points 5 and thus doubled with those already on the latter points in readiness to be united by a subsequent sewing operation. The function of transferring the fabric loops, as just noted, is performed by a semi-annular stripper element 8 which is associated with the segment 1 and provided with a series of loop-engaging projections 9 that extend outwardly through the intervals between the points 4. This stripper element 8 is attached to the segment 1 with capacity for being relatively moved from the position of Fig. I to that of Fig. II, under guidance afforded by rods 10—10 slidable in said segment. The inner ends of the rods 10—10 are rigidly connected by an arcuate bridging bar 11 whereby the stripper element 8 may be actuated from above as considered with respect to Fig. II. With the segment 2 is associated a stripper element 12 which is identical with the stripper element 8 aforesaid and similarly guided by rods 13 and provided with an arcuate actuating bar designated at 14. In order to insure against accidental removal of the knitted web "W" from the points 5 of the segment 2 during stitch doubling and sewing, the actuating plate 14 of the stripper element 12 is provided along its inner edge with web engaging barbs or spurs indicated at 15 in Figs. I, II and V. For the purpose of preventing the knitted web "W" which hangs down inside the web carrier base ring 3 from contacting with, or being caught by, the hinge bars 6—6 during turning of the segment 1, I secure to the segment 2 a semi-circular guard 16 which occupies a position between the web and hinge bars, as shown. During folding of the web "W", the loops at or near the line of fold will obviously be subjected to strain. In order to resist such strain, pins 17 are provided for staking the web "W" adjacent the line of fold, as shown in Figs. I and II, said pins projecting upwardly from the segment 2.

As a means for normally locking the segments 1 and 2 of the web carrier in the open position of Fig. I, I provide a spring actuated latch 18 which is pivoted to the base ring 3 and designed to engage a notched pin 19 on the segment 1, see Figs. I and III. Unlocking of the segments 1 and 2 at the proper time is effected by means of a beveled toe 20 adapted to be projected through an opening 21 in said segment and to act upon the upper end of the latch 18 to swing the same out of engagement with the pin 19 as illustrated in Fig. IV.

Proceeding now to a description of the web uniting machine and the mechanism embodied therein for automatically manipulating the web carrier, and referring more particularly to Figs. VI, VII, VIII and IX of the drawings, 25 indicates the driving shaft of the machine, the same being journalled in suitable bearings 26 of the machine frame 27.

This shaft 25 has at one end a pulley 29 Fig. VI which may be co-ordinated by a belt with any convenient source of power, and at the other end a pulley 30, the latter adapted for belt connection with the pulley 31 of the sewing mechanism partly shown in Fig. VII and comprehensively indicated by the letter "S" in Fig. VII of the drawings. The pulley 29, it will be observed, is loose on the shaft 25, a clutch 32 being provided for transmitting motion of said pulley to the shaft under control of a shifter lever 33. The sewing mechanism "S" employed is identically the same as in the patent referred to and need not therefore be specifically described herein other than by occasional reference thereto hereinafter.

Rotatably supported in the bed plate 34 of the machine is a cylindrical holder 35 designed to support the web carrier during the sewing operation. This holder 35 has an expanded base 36 toothed on its outer edge, as indicated at 36ª in Fig. XV, for intermittent actuation by a pawl (not shown) so that the doubled loops on the points 5 of the transfer device aforesaid are successively presented to the needle of the sewing mechanism precisely as in the cited patent. Mounted on the frame 27 of the machine is a cam drum 37 having its lower end formed as a ratchet wheel 38 whose teeth are successively picked by a spring pressed pawl 39 pivoted to the forward end of a slide 40 to which movement in one direction is imparted by an eccentric cam 41 (Figs. VII and IX) on the shaft 25, said cam acting upon an antifriction roller 42 carried by an arm 43 which is fulcrumed at its lower end to the frame 27 of the machine, and in engagement at its upper end with a pin 44 projecting from the slide 40. The roller 42 is maintained in contact with the eccentric cam 41 by a contractile spring 45 in tension between a pin on the upper end of the arm 43 and a fixed anchorage pin 46 on a tail extension 47 of one of a pair of plates 48 which serve to retain the slide 40 in its guide.

Also fulcrumed to the machine frame 27 at one side are a pair of similarly configured compound horizontal levers 49, 50 and a bell crank lever 51, see Figs. VI and VIII. One extremity of each of these compound levers 49, 50 carries an anti-friction roller which is under control of a circumferential groove of the cam drum 37, these grooves being respectively numbered 52, 53, 54 and serving, as the drum is rotated, to cause the levers 49, 50, 51 to be rocked on their pivots at the proper periods in the cycle of operation of the machine in accordance with the notations on Fig. XVII. The upright arm of the bell crank lever 51 is in the form of a gear sector having teeth 55 for meshing engagement with a pinion 56 on a horizontally-disposed shaft 57, the latter being rotatably mounted in a fixed bearing 58 (Figs. VI and VIII). To the inner extremity of the shaft 57 is secured an arm 59 whereto is pivoted a lever 60 that carries the beveled toe 20 previously referred to. The lever 60 is bifurcated adjacent its pivot, as indicated at 61, to engage a pin 62 on the end of an arm 63. This arm is fast on a vertical shaft 64 which extends downwardly through a fixed bearing bracket 65 projecting from the bed plate 34 of the machine, and has secured to its lower end a dog 66 provided at opposite extremities with beveled projections 67—68. On its top, the cam drum 37 carries cam lugs 69 and 70 which, as the drum is rotated in the direction of the arrow in Fig. VI, successively engage the beveled projections 67 and 68 of the dog 66 thereby rocking the arm 63 so as to cause the toe 20 to be thrust into the opening 21 of the segment 1 of the web carrier to shift the latch 18 and thus release the pin 19 preparatory to turning of said segment 1 over onto the segment 2. Such turning movement is effected through partial rotation of the shaft 57 in the direction of the arrow in Fig. VIII when the bell-crank lever 51 is rocked on its pivot in the direction of the arrow thereon under the influence of the groove 54 of the cam drum 37. Reverse movement of the arm 63 is effected by engagement of the cam lug 69 with the projection 68 of the dog 66; but this does not move the lever 60 as the latter is not then in position to be engaged by said arm, see Fig. XI. Subsequent engagement of the cam lug 70 with the projection 67 of the dog 66 restores the arm 63 to its normal position in readiness to again engage the lever 60, when the segment 1 is swung back into the position shown in Figs. I and X. The final interaction of the lug 70 with the projections 68 of the dog 66 causes the arm 63 to swing the lever 60 so as to free the toe 20 from the segment 1 of the transfer device or web carrier. During rotation of the arm 59, the lever 60 is held from independent movement by a spring pressed pin 59ᵃ which yieldingly engages a notch in the fulcrum boss of said lever, as shown in Figs. X and XI.

The mechanism for controlling the action of the stripper element 8 of the transfer device is shown in Figs. VI, VIII, XII, XIII, XIV, and will now be described. Rising from the bed plate 34 of the machine is a fixed post 75 to the upper end of which is fulcrumed a bell crank lever 76. One extremity of this lever is connected by a link 77 to the compound lever 50 previously described, while its other extremity has pivoted to it an oscillating lever 78, whose long arm has a bent end 79 with a notch 80 therein, and an inwardly projecting lug 81 above said notch, as shown in Fig. VIII, the short arm of said lever being connected by a link 82 to the lever 49 previously described. When the web carrier segment 1 has been turned over onto the segment 2 as shown in Fig. II, the lever 78 is swung downward about its pivot so that the lug 81 acts upon the stripper-actuating bar 11 to depress the stripper element 8 to the position shown in the illustration last referred to. During this action, the bridging bar 11 is free from engagement with the notch 80; but, after the transfer of the fabric loops has been effected, the bell crank lever 76 is rocked about its pivot on the post 75 to shift the lever 78 bodily so as to engage the inner edge of said bar in the notch 80, as shown by full lines in Fig. XIII. Thereupon the lever 78 is again rocked in a direction reversely of the movement previously imparted so as to lift the bar 11 and the stripper element 8 back to its normal position shown by dotted lines in Fig. XIII. The bell crank lever 76 is then in turn rocked in a direction the reverse of its former movement so as to carry the lever 78 inwardly from the position shown in full lines to that in dotted lines in Fig. XIV, and thereby disengage the notch 80 and bar 11, the lever 76 and 78 being thereupon returned to the normal position shown in Fig. VIII, so as not to interfere with subsequent turning of the segment 1 back to the normal position of Fig. I. The latter movement is effected by a reversal in the direction of rotation of the shaft 57, and, as soon as such movement has been completed, the toe 20 is withdrawn from the opening 21 by retraction of the lever 60 when the beveled projection 68 of the dog 66 is acted upon by the cam lug 70.

A third cam lug 85 on the top of the cam drum 37 (which lug is higher than the lugs 69, 70) is designed to engage the end of one arm of a compound lever 86 pivotally mounted at 87 upon a portion of the bed plate 34, as shown in Fig. VI, said lever 86 having, on its other arm, a finger 88 which, by contact with one arm of a rock lever 89 comprised in the sewing mechanism "S" Fig. VII moves the pulley 31 into position to bring a spring projected pin 90 on the pulley into engagement with the radially projecting pin 91 on the shaft 92 of the sewing mechanism "S", and thereby starts rotation of said shaft, the parts being left in this relation when the cam lug 85 passes beyond the toe of the lever 86 in the continued rotation of the cam drum 37. In connection with the sewing mechanism "S" it is to be noted that the needle and looper eccentric actuators, $a$, $a'$ respectively, are fragmentarily illustrated in Fig. VII, while motion is transmitted thereto from the spur wheel $b$ on the shaft 92 above described. Also, attention is again directed to my prior Patent #1,315,064, for a clear understanding of the co-operative relation existent between the sewing mechanism "S" and the transfer device or web carrier. After the cam drum 37 has completed a full rotation, the pawl 39 plays upon a blank surface 93 of the ratchet wheel 38, as shown in Fig. VI, and further rotation of said drum is thereby arrested, reciprocating movement of the pawl 39 continuing however until the sewing operation is completed. In order to initiate rotation of the cam drum 37, the latter is moved slightly ahead by a starting lever 94 which carries a spring pressed pin 94$^a$ (Fig. VIII), said pin engaging one of the teeth of the ratchet 38 and serving to move the latter ahead sufficiently to bring the first tooth in the rear of the blank surface 93 into range of the pawl 39.

After the sewing operation is completed, the line of extra trailing sewing stitches is severed by a pair of shear blades 95—96, (Fig. VI) as in the herein referred to patent. The stationary blade 95 of the pair is carried by a segmental plate 97 (Figs. XVIII and XIX) which plate is slotted as at 98 for guidance by screws 99, on the holder cylinder 35. This provision is made necessary so that the shear structure 95—96 may, as a whole, be moved out of the way to permit turning of the web carrying segment 1 over upon the segment 2. Inasmuch as the bottom of the segment 1 is considerably below the axis 7 of the hinge, its front edge swings forwardly at the time it swings upwardly and hence would contact with the shears 95—96 unless the latter are moved out of the path of the segment 2. In order to shift the shears 95—96 ahead on the holder 35 for the reason stated, a spring-pressed pawl 100 (Fig. VI) is carried by the U-shaped head 101 at the top of the vertical arm of a lever 102 which is pivotally mounted upon the machine frame 27 as shown in Fig. IX, and operated by the eccentric cam 41 (previously referred to) which cooperates with a roller 103 on the horizontal arm 104 of said lever. The spring-pressed pawl 100 acts first upon a pin 105 on the fixed blade 95 of the shears, and then upon one or both of a pair of pins 106—107 on the rock lever 108 which actuates the movable blade 96, see Fig. XVIII. The shears 95—96 are thus pushed ahead and out of interfering position. However, before the shears 95—96 are actuated to sever the trailing line of sewing stitches, they are restored to their normal position by contact with a suitable stop 109 (Fig. VII) on the framework of the sewing mechanism "S", said stop being subsequently moved out of the way when the sewing mechanism "S" is retracted after the completion of the sewing operation, as in the herein cited patent.

By reference to Figs. XV and XVI it will be noted that the cylinder 35, which serves as the holder for the web carrier during the sewing operation, has vertical guides at opposite points on its inner side for the reception of two pairs of lifter bars 110—110 and 111—111, each of said bars having at its lower end a projecting pin 112 adapted to engage in cam slots 113 in depending portions 114 of the bed plate 34 of the machine. The lifter bars 110 are longer than the bars 111 and are bent inward at their upper ends so that when elevated they act upon the bridging and actuating bars 11, 14 respectively, to push the strippers 8 and 12 to their extreme positions just back of the ends of the points 4—5 in which positions they facilitate subsequent application of the carrier to the knitting machine to receive a new stocking. The bars 111, in turn, act upon the base ring 3 of the web carrier so as to displace the latter bodily from its position in the holder 35. As the holder 35 rotatees in the direction of the arrow Fig. XVI, therefore, the pins 112 of the lifter bars 110 are first acted upon by the cam slots 113 and then the pins of the lifter bars 111, each said bar being first projected and then retracted. In order to prevent the web carrier from falling back into the holder 35 when the lifter bars 111 which raised the same are withdrawn, one of said bars is caused to impart greater lifting movement than the other at one side of the web carrier so as to tilt the same after it has cleared the holder 35. This movement may be effected by providing one of the lifter bars 111 with a spring supported pin 115 normally projecting above the top of the same, as shown in Figs. XV and XVI. The proper position of the web carrier in the cylindrical holder 35 is determined by registry of a projecting pin 116 on the segment 2 (Figs. I and II) with a recess 117 in the upper edges of said holder (Figs. VI and XVI). One side of this recess 117 is vertical and the other inclined, hence, when the web carrier is placed into the holder 35, the inclined side will serve to direct the pin 116 against the vertical side and thus properly and circumferentially register the web carrier with respect to the holder 35.

The possibility of injurious contact of the points 4, 5 is prevented and their accurate registry, both radially and circumferentially, assured when the segment 1 is folded over upon its companion 2, by cooperation of a depending pin 118 on a lateral arm 118$^a$ of the segment 1, (Figs. I and II) with a conical aperture 119 in a projection 119$^a$ of the fixed post 75 (Fig. VIII), the pin 118 being provided with a tapered point, as shown, so as to be self-aligning. It is essential, however, that the opposed points 4, 5 contact intimately during movement of the stripper 8 in shifting the fabric loops between them, and to this end I provide for the maintenance of light yielding pressure upon the turnable segment 1 of the web carrier. Such pressure may be induced for example by a spring tongue 78ª secured to one side of the lever 78, the position of said tongue being so adjusted as to predetermine its engagement with the segment 1 in advance of the actuation of the stripper 8. The action of the parts to which reference has just been made will be readily understood from Fig. XIII.

As in my former patent, the sewing mechanism has a tendency to swing toward the web carrier when permitted to do so by the circumferential cam ridge 120 on the cylindrical holder 35, said ridge acting upon the toe 121 of a lever arm 122 connected to the sewing mechanism "S". Gradual approach of the sewing mechanism "S" toward the web carrier so as to prevent possible derangement of the former with respect to the points 4, 5 of the carrier through sudden shock or jar, is effected by recessing the end of the cam ridge 120 as indicated at 123 in Fig. VI, so that the approach of the sewing mechanism "S" is by a succession of steps, the final step bringing the sewing needle into proper registry with the first of the points 5 carrying the doubled loops in readiness to penetrate said loops.

The operation of the machine is as follows:

Assuming the various parts of the machine to be at rest in the positions shown in the drawings with the shear members 95—96 retracted, the divided web carrier, (with the stocking web "W" as received from the knitting machine upon it), is placed in the cylindrical holder 35, care being exercised that the projecting pin 116 on said carrier is properly registered with the notch 117 of said holder. With this preparation, movement of the cam drum 37 is initiated by shifting the starting lever 94. On the first pick of the pawl 39, the cam lug 69 of the drum 37 is immediately brought into engagement with the dog 66 as a result of which the beveled toe 20 of lever 60 is thrust through the opening 21 of segment 1 of the web carrier Fig. X to withdraw the latch 18 so as to unlock said segment, as shown in Fig. IV. This is followed by partial rotative movement of the shaft 57 under the action of the cam drum 37 which causes the arm 59 to turn the carrier segment 1 over as in Fig. II. In continued rotation of the cam drum 37 the lever 78 is moved downwardly, its toe 81 engaging the bridging plate 11 and depressing the stripper 8 to displace the fabric loops from the points 4 and double them with those already on the points 5. The lever 78 is next bodily shifted laterally to engage its notch 80 with the inner edge of the bridging bar 11 and immediately thereafter swung to restore the stripper 8 to its normal position as in Fig. I. After having performed the just described function, the lever 78 is again bodily shifted but in a reverse direction to disengage its notched end 80 from the bar 11, and with this accomplished, finally swung through the remainder of its stroke to the normal position of inactivity shown in Fig. VIII. The carrier segment 1 now ready to be restored to its initial position, is turned back by reverse movement of the gear sector 55 as prompted by the groove 54 of the cam drum 37, whereupon the toe 20 of the lever 60 is in turn withdrawn from the segment 1 under the action of the cam lug 70 on said drum. The compound lever 86 is next acted upon by the cam lug 85 resulting in the shifting of the pulley 31 on the shaft 92 and starting of of the sewing mechanism "S". The doubled loops of the superposed fabric edges, held by the points 5, are thereupon successively stitched together in being presented to the needle of the sewing mechanism "S" through the successive movements of the carrier 35, and after the sewing is accomplished, the shears 95—96 are actuated to sever the trailing line of uniting stitches in precisely the same manner as described in the hereinbefore referred to patent. Following this step the lifter bars 110 are elevated to engage the bridging and actuator bars 11, 14 respectively and raise the strippers 8 and 12 for the purpose already explained, whereupon the lifter bars 111 are in turn brought into action to displace the web carrier from its holder 35, the spring supported pin 115 in one of said bars 111 operating incidentally to tilt the web carrier so as to prevent it from falling back to the position which it originally occupied in the holder. After all the operations of the machine are accomplished the pulley 31 of the sewing mechanism is automatically restored to the position shown in Fig. VII in the same manner, as set forth in Patent #1,315,064, by the mechanism provided for that purpose. By this time the cam drum 37 has completed a full rotation with the pawl 39 playing idly on the blank surface 93 of the ratchet wheel 38.

Having described my invention, I claim:

1. In mechanism for uniting knitted webs, the combination of a web carrier comprising two members each with fabric loop-engaging points and one capable of being turned over upon the other, an element for engaging said turnable member, means for swinging said element about an axis to impart turning movement to said member, and means for moving said engaging element into and out of engagement with the turnable member.

2. In mechanism for uniting knitted webs, the combination of a web carrier comprising two members each with fabric loop-engaging points and one capable of being turned or folded over upon the other, an element for engaging said turnable member, means for swinging said element about an axis to impart turning movement to said member means for moving the engaging element into and out of engagement with the turnable member, a locking device for retaining said member in the unfolded position, and means whereby the engaging element unlatches said locking device.

3. In mechanism for uniting knitted webs, the combination of a web carrier comprising opposed members, each with stitch impaling points, a pivotal connection between said members, and a guard preventing the web from being caught in the pivotal connection during folding of said members.

4. In mechanism for uniting knitted webs, the combination of a web carrier comprising two members each having fabric loop-engaging points and one capable of being turned over upon the other, a stripper for shifting the fabric loops from the points of one member to those of the other, a device separate from said stripper but movable into engagement therewith to actuate the same, and means for operating said engaging device.

5. In mechanism for uniting knitted webs, the combination of a web carrier comprising two members, each with fabric loop-engaging points and one capable of being turned over upon the other, a stripper for transferring the fabric loops from the points of one member to those of the other, a bar connected to said stripper, a notched lever for engaging said bar, and means for moving said lever so as to engage said bar within the notch or release it therefrom.

6. In mechanism for uniting knitted webs, the combination of a web carrier comprising two members, each with fabric loop-engaging points and one capable of being turned over upon the other, a stripper for transferring the fabric loops from the points of one member to those of the other, a bar connected to said stripper, a notched lever for engaging said bar, means for moving said lever so as to engage said bar within the notch or release it therefrom, and means for moving said lever in a direction transverse to that of the engaging and disengaging movements.

7. In mechanism for uniting knitted webs, the combination of a web carrier comprising two members, each with fabric loop-engaging points and one capable of being turned over upon the other, a stripper for transferring the loops from the points of one member to those of the other, a bar connected to said stripper, a notched lever for engaging said bar, a bell crank lever to which said notched lever is pivoted, means for rocking said bell crank lever, and means for rocking said notched lever thereon.

8. In mechanism for uniting knitted webs, the combination of a web carrier comprising two members, each with fabric loop-engaging points, and one capable of being turned over upon the other, means for effecting such turning movement, comprising a rock shaft with an arm thereon, and means pivotally mounted on said arm so as to be swung into and out of engagement with the turnable member of the web carrier.

9. In mechanism for uniting knitted webs, the combination of a web carrier comprising two members each with fabric loop-engaging points and one capable of being turned over upon the other, means for effecting such turning movement comprising a rock shaft with an arm thereon, means for imparting the movement of said arm to the turnable member of the web carrier, a pinion on said rock shaft, a lever having a rack for engaging said pinion, and means for oscillating said lever.

10. In mechanism for uniting knitted webs, the combination of a web carrier comprising two members one capable of being turned over upon the other, mechanism for effecting such turning movement, a cam drum for operating said turning mechanism, and means for actuating said cam drum.

11. In mechanism for uniting knitted webs, the combination of a web carrier comprising two members, one capable of being turned over upon the other, and means for effecting such turning movement comprising a rock shaft with an arm thereon, a lever pivotally mounted upon said arm, an operating arm in engagement with said lever, an oscillatable shaft carrying said operating arm and having a dog with projections thereon, a cam drum having cam lugs for acting upon said projections in succession and thereby causing back and forth movement of said shaft, and means for rotating said cam drum.

12. In mechanism for uniting knitted webs, the combination of a web carrier comprising two members one capable of being turned over upon the other, and means for effecting such turning movement comprising a rock shaft with an arm thereon, a lever pivotally mounted upon said arm, an operating arm in engagement with said lever, an oscillatable shaft carrying said operating arm and having a dog with projections thereon, a cam drum having a pair of cam lugs thereon adapted to act in succession upon the projections of said dog, and means for rotating said cam drum.

13. In mechanism for uniting knitted webs, the combination of a web carrier comprising two members one capable of being turned over upon the other, a rotatable holder for the web carrier, cutting shears mounted on the holder with capacity for being temporarily moved bodily out of the way to permit turning of the carrier member as aforesaid, and means for effecting such movement of the shears.

14. In mechanism for uniting knitted webs, the combination of a web carrier comprising two members one capable of being turned over upon the other, a rotatable holder for the web carrier, cutting shears mounted on the holder with capacity for being temporarily moved bodily out of the way to permit turning of the carrier member, a reciprocating bar for moving the shears as aforesaid, and a stop for subsequently returning the shears to their normal position.

15. In mechanism for uniting knitted webs, the combination of a web carrier comprising two members, one capable of being turned over upon the other, a rotatable holder for the web carrier, cutting shears mounted on the holder with capacity for being temporarily moved bodily out of the way to permit turning of the carrier member, and means for moving the shears as aforesaid including a reciprocating bar with a swinging pawl thereon, and contact members, one in advance of the other on the shears, adapted to be acted upon successively by the pawl.

16. In mechanism for uniting knitted webs, the combination of a web carrier comprising two members, each with fabric loop-engaging points and one capable of being turned over upon the other, and means for arresting the turning movement of one member in respect to the other comprising cooperative elements with self-aligning engaging portions whereby accurate registry of the loop-engaging points is assured.

17. In mechanism for uniting knitted webs, the combination of a web carrier, a holder therefor, and means for displacing the web carrier from the holder upon completion of the uniting operation.

18. In mechanism for uniting knitted webs, the combination of a web carrier, a holder therefor, means for displacing the web carrier from the holder upon completion of the uniting operation, and means for thereafter maintaining the carrier in tilted position to prevent it from falling back into the holder.

19. In mechanism for uniting knitted webs, the combination of a web carrier comprising two inter-pivoted members each with fabric-loop-engaging points, a holder for the carrier, means for automatically turning one of said members over the other to effect registry of the respective loop-engaging points and for automatically restoring the turnable member to the normal position in the holder after transfer of the loops therefrom for doubling with those on the points of the other member, and means for automatically displacing the web carrier from the holder upon completion of the loop-uniting operation.

20. In mechanism for uniting knitted webs, the combination of a web carrier, a holder therefor, pusher bars for displacing said web carrier from the holder, and means for actuating said pusher bars.

21. In mechanism for uniting knitted webs, the combination of a web carrier, a holder therefor, oppositely disposed pusher bars for ejecting said web carrier from said holder, means for actuating said pusher bars to free the web carrier from said holder, and means for continuing the thrust of one of said pusher bars to tilt the freed web carrier.

22. In mechanism for uniting knitted webs, the combination of a web carrier, a holder therefor, two sets of pusher bars on said holder, one set for acting upon members of the web carrier and the other set for pushing said web carrier from the holder.

23. In mechanism for uniting knitted webs, the combination of a web carrier comprising two members hinged together so that one can be turned over upon the other, one of said members having outwardly projecting stake pins for preventing disarrangement of the web adjacent the hinges during the latter part of the turning operation.

24. In mechanism for uniting knitted webs, the web carrier comprising two members each with fabric loop-engaging points and one capable of being turned over to bring its points in opposed relation with the points of the other, in combination with manipulating means for effecting shifting of the fabric loops between the opposed points of the web carrier, and means insuring contact of the point ends during such loop shifting.

25. In mechanism for uniting knitted webs, the web carrier comprising two members each with fabric loop-engaging points and one capable of being turned over to bring its points in opposed relation with the points of the other, and a stripper for shifting the fabric loops between the opposed points, in combination with a swingable arm for manipulating the stripper aforesaid, and means carried by said arm for engaging the turnable member of the web carrier to insure contact of the opposed point ends during loop shifting.

26. In mechanism for uniting knitted webs, the web carrier comprising two members each with fabric loop-engaging points and one capable of being turned over to bring its points in opposed relation with the points of the other, a stripper for shifting the fabric loops between the opposed points, in combination with a swingable arm for manipulating the stripper aforesaid, and yielding means carried by said arm for engaging the turnable member of the web carrier prior to actuation of the stripper to insure contact of the ends of the opposed points during loop shifting between them.

27. In a machine of the character described, a web carrier comprising two members each having fabric loop-engaging points with one capable of being turned over to bring its points in opposed relation with the points of the other, and a stripper for transferring some of the fabric loops, in combination with an oscillatory lever for manipulating the stripper, and a spring finger carried by said lever for engaging the turnable member of the web carrier to insure contact of the ends of the opposed points during loop transfer.

28. In mechanism for uniting knitted webs by aid of a device embodying complementary sets of fabric loop-engaging points and a stripper for transferring fabric loops from one set of points onto the other to double them with the loops on the latter; the combination of a control means to activate separate mechanisms for automatically effecting alignment of one set of the aforesaid points with the other, transfer of loops from one set thereof onto the other set to double them with the loops of the latter, actuation of stitch mechanism for continuously uniting the doubled loops, and operation of cutting means for severing trailing stitches after completion of the uniting operation, all in successively timed relation and in the order stated.

29. In mechanism for uniting knitted webs by aid of a device embodying two sets of fabric loop-engaging points, and a stripper for transferring fabric loops from one set of points to the other to double them with the loops already on the latter points; the combination of a single rotary-cam control-device adapted to successively activate mechanism for automatically swinging one set of the loop engaging points over onto the other set to bring the aforesaid points into alignment, to operate stripper mechanism for transferring the loops from one set thereof to the other set to double them with the loops on the latter, to operate stitch mechanism for continuously uniting the doubled loops, and to actuate cutting means for severing trailing chain stitches after completion of the uniting operation.

30. In mechanism for uniting knitted webs by aid of a device embodying complementary sets of fabric loop-engaging points, and a stripper for transferring fabric loops from one set of points to the other to double them with the loops already on the latter points; the combination of mechanism including a single control element adapted to automatically bring about alignment of one set of the aforesaid points with the other and to actuate the stripper.

31. In mechanism for uniting knitted webs by aid of a device embodying two sets of fabric loop-engaging points, and a stripper for transferring fabric loops from one set of points to the other to double them with the loops already on the latter points; the combination of a single rotary control element adapted to operate mechanism for automatically moving one set of points over into alignment with the other set and to effect automatic transfer of the loops from one set of said points onto the other to double them with the loops on the latter set.

32. In mechanism for uniting knitted webs by aid of a device embodying two sets of fabric loop-engaging points, and a stripper for transferring fabric loops from one set of points to the other to double them with the loops already on the latter points; the combination of a single rotary cam device adapted to operate mechanism for automatically transferring the loops from one set of points to the other to double them with the loops on the latter, and means also controlled by said cam device for seubsequently and automatically activating sewing mechanism for continuously uniting the doubled loops.

33. In mechanism for uniting knitted webs by aid of a device embodying interpivoted members each with a set of fabric loop-engaging points and a stripper for transferring fabric loops from one set of points to the other to double them with the loops on the latter; the combination of cam actuated mechanism adapted to automatically swing one of said members over the other to effect alignment of the points thereon with the points of the other member and also to actuate the stripper for transferring the loops from one set of said points to the other and to double them with the loops already on the latter.

34. In mechanism for uniting knitted webs by aid of a device embodying interpivoted members each with a set of fabric loop-engaging points, and a stripper for transferring fabric loops from one set of points to the other to double them with the loops on the latter; the combination of latching means actuable to lock the aforesaid members in the open position, and cam actuated mechanism adapted to automatically release said latching means and swing one of said members over onto the other to effect alignment of the loop-engaging points thereon with the points of the other member and also to actuate the aforesaid stripper, for the purpose specified.

35. In mechanism for uniting knitted webs by aid of a device embodying interpivoted members each with a set of fabric loop-engaging points, and a stripper for transferring fabric loops from one set of points to the other to double them with the loops on the latter; the combination of cam actuated mechanism adapted to automatically swing one set of points over the other to effect registry of the respective loop-engaging points, and to automatically restore said turnable set of points to its normal position after transfer of the loops therefrom for doubling with those on the other set of points.

In testimony whereof, I have hereunto signed my name at Philadelphia, Pennsylvania, this 6th day of December, 1923.

LOUIS N. D. WILLIAMS.